United States Patent
Dentsbier

[11] Patent Number: 5,560,138
[45] Date of Patent: Oct. 1, 1996

[54] FISHING ROD HOLDER

[76] Inventor: William M. Dentsbier, 716 Teson, St. Louis, Mo. 63042

[21] Appl. No.: 341,376

[22] Filed: Nov. 17, 1994

[51] Int. Cl.⁶ ................................................. A01K 97/10
[52] U.S. Cl. .......................................... 43/21.2; 211/70.8
[58] Field of Search ................ 43/21.2, 26; D22/147; D6/552, 512; 211/60.1, 66, 70.5, 70.8; 248/201, 537, 222.4, 534, 316.5, 22501; D8/349, 354, 366; 224/922

[56] References Cited

U.S. PATENT DOCUMENTS

| D. 223,262 | 4/1972 | Stahl | D6/552 |
|---|---|---|---|
| D. 245,554 | 8/1977 | Surkin et al. | D6/552 |
| D. 354,188 | 1/1995 | Koehler | D6/553 |
| 1,265,999 | 5/1918 | Cusanelli | 248/298 X |
| 2,171,053 | 8/1939 | White | 224/922 |
| 3,270,996 | 9/1966 | Churchill et al. | 248/223.4 |
| 3,282,519 | 11/1966 | Rheinstrom | 248/222.4 X |
| 4,482,121 | 11/1984 | Fink | 248/223.4 |
| 5,005,509 | 4/1991 | Williams | 211/60.1 X |

FOREIGN PATENT DOCUMENTS

| 221202 | 10/1957 | Australia | 248/222.4 |
|---|---|---|---|
| 1202745 | 1/1960 | France | 248/222.4 |

OTHER PUBLICATIONS

E & B Marine Supply, Inc., p. 60, received Jun. 19, 1980. Rail Clamps Model #HR-100.

*Primary Examiner*—J. Elpel
*Attorney, Agent, or Firm*—Kalish & Gilster

[57] ABSTRACT

A device for supporting a fishing rod in a preselected position in relation to a structural surface, includes a base adapted for attachment to the structural surface and a body slidably releasably connected to the base. The body is formed to receive and retain a portion of the fishing rod to thereby permit selective securement and release thereof in a preselected position on the structural surface.

20 Claims, 3 Drawing Sheets

5,560,138

FISHING ROD HOLDER

BACKGROUND AND SUMMARY OF THE INVENTION

The present invention relates generally to the field of devices for holding a fishing rod in place, and, more particularly, to a clamping device for easily securing one or more fishing rods in a preselected position on a support surface for storage or transport of the rod(s).

Fishing rods, by their nature tend to be awkward and difficult to maintain temporarily in a given position for storage or transport when the rods are in their fully assembled, elongated state. This is the case because of the usual extreme length and flexibility of such rods and the weight in balance caused by having a handle and reel on one end thereof. Of course a degree of care must be used in handling a rod, which can be damaged if handled too roughly, dropped or smashed, and to avoid accidental entanglement with the fishing line and hook. Accordingly there is an established need for a device to securely and easily maintain a fishing rod in its assembled state for storage, such as on a garage wall, and transport, such as in a camper, truck or on an open boat deck.

Accordingly, it is among the several advantages of the present invention that it provides a simple, efficient and economical device for quickly and easily securing one or more fishing rods in a preselected position to a support surface such as a wall, deck or ceiling.

It is further among the advantages of the present invention, having the features indicated, that the new fishing rod holder be useful in combinations of two or more such holders and that it be capable of use to retain one or more fishing rods, with or without fishing lines attached, in a specific position at a particular site until selectively removed from the holder(s).

Accordingly, in furtherance of the above goals, the present invention is, briefly, a device and method for using same for supporting a fishing rod or other similarly rod-shaped object in a preselected position in relation to a structural surface. The device includes a base adapted for attachment to the structural surface and a body connected to the base. The body is formed to receive and retain a portion of the fishing rod to thereby permit selective securement and release thereof in a preselected position on the structural surface.

The invention is further, briefly, a fishing tackle accessory kit having at least two fishing rod holders, the holders each including a device for supporting a fishing rod in a preselected position in relation to a structural surface. The device has a base adapted for attachment to the structural surface and a body connected to the base. The body is formed to receive and retain a portion of the fishing rod to thereby permit selective securement and release of the fishing rod or any other rod-shaped object in a preselected position on the structural surface.

Further, in the invention, the base is an elongated substantially flat rigid piece having a first wide side surface and an opposed second wide side surface and an outer side wall extending between and connecting the first wide surface and the second wide surface.

Also, in the invention, briefly, the base has paired longitudinal grooves formed from the first wide surface through the second wide surface. The grooves are positioned spacedly from one another and longitudinally outwardly from the center of the base. The first part of the body has first and second opposed surfaces which extend between and intersect the first end and the second end of the first part of the body and the second part of the body has first and second opposed surfaces which extend between and intersect the first end and the second end of the second part of the body, the second surface of the first part of the body and the first surface of the second part of the body being disposed substantially parallel, adjacent and coextensively when the device is in the normal closed, operating position. In this case, the body has projections on the second surface of the second part of the body, the projections being sized and spaced so as to be capable of sliding interconnection with the longitudinal grooves formed through the base, to thereby selectively releasably interconnect the body to the base.

Other advantages will be in part apparent and in part pointed out hereinbelow.

BRIEF DESCRIPTION OF THE DRAWINGS

Throughout the drawings like parts are provided with like element numbers.

DESCRIPTION OF PRACTICAL EMBODIMENTS

Figures 1, 2:
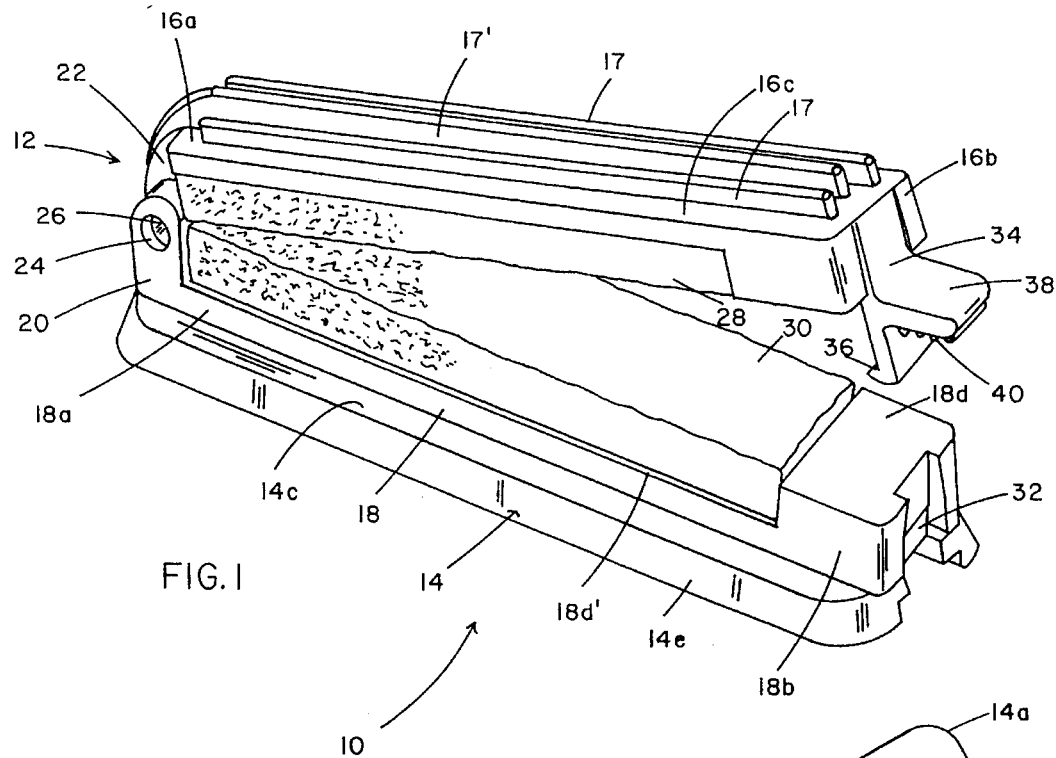
FIG. 1 is a perspective view of a fishing rod holder constructed in accordance with and embodying the present invention, shown open and in an upright position.
FIG. 2 is a bottom perspective view of the fishing rod holder of FIG. 1, in closed functional position, with the base of the holder moved longitudinally with relation to the body of the holder so as to be ready for immediate release therefrom.
Figure 6:
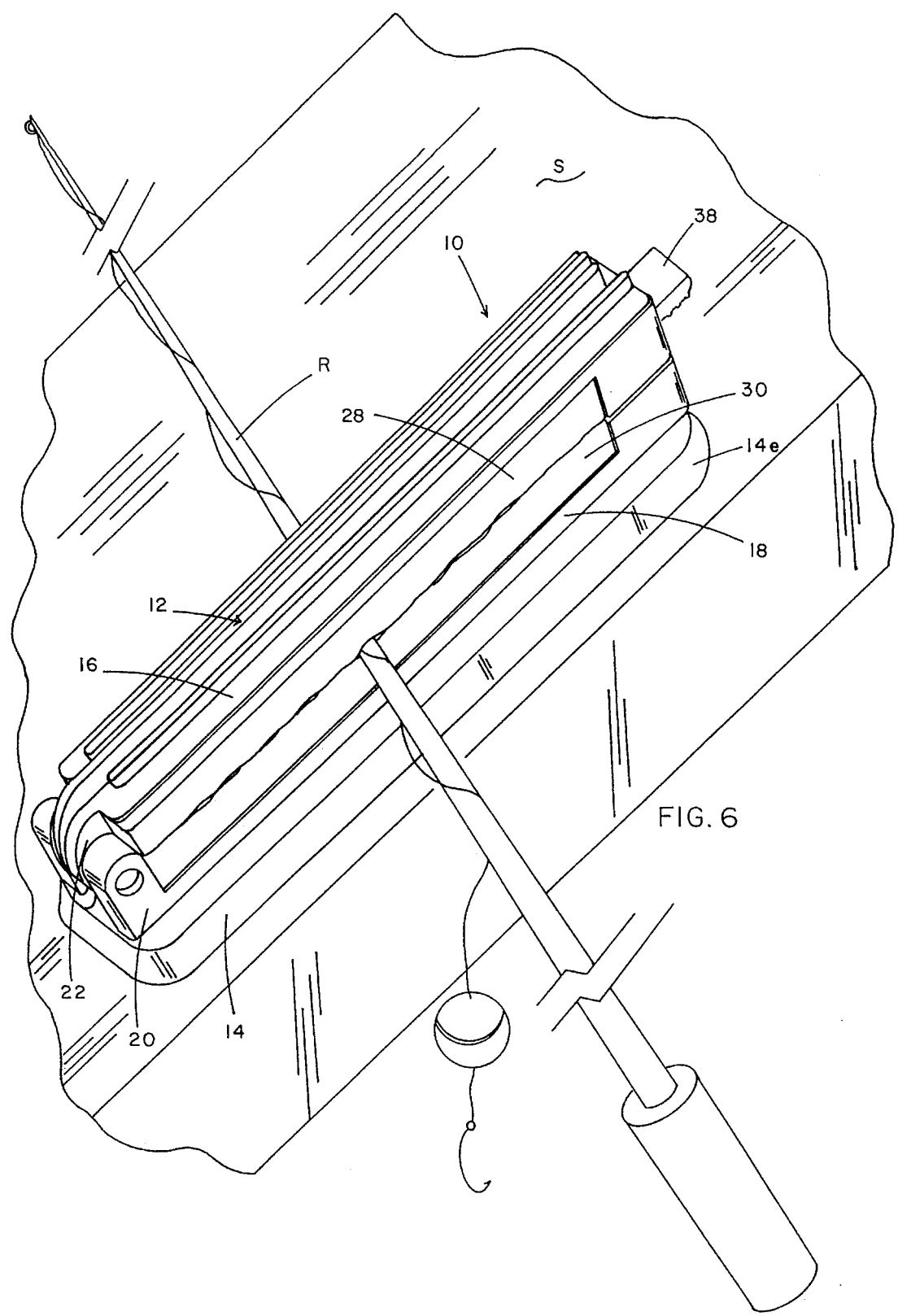
FIG. 6 is a perspective view of the fishing rod holder of FIG. 1, shown closed, retaining a fishing rod therein and attached to a surface as an example of use of the new device.

With reference to the drawings, and particularly FIGS. 1, 2 and 6, reference numeral 10 generally designates a holder constructed in accordance with and embodying the present invention. Holder 10 is for retaining in a preselected position one or more slender, elongated, rod-shaped objects, especially fishing rods, such as that indicated at R in FIG. 6. It is to be understood that rod R could be some other thin, elongated object, such as a golf club, badminton racket handle, etc. However, for purposes of simplicity, this discussion will assume that the object in question is a fishing rod, as that is expected to be the primary object with which rod holder 10 is to be used.

Figure 3:
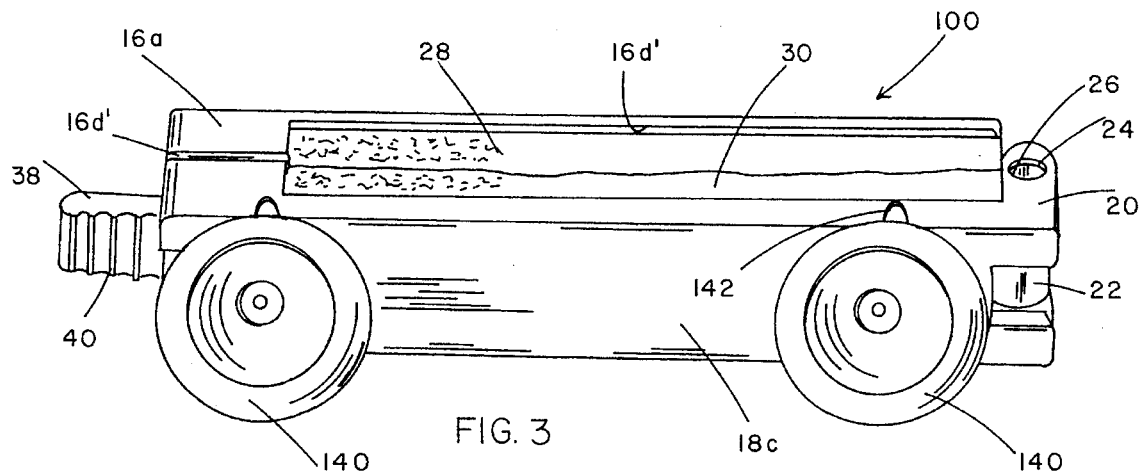
FIG. 3 is a bottom perspective view of an alternative embodiment of the fishing holder of FIG. 1, shown closed.
Figure 4:
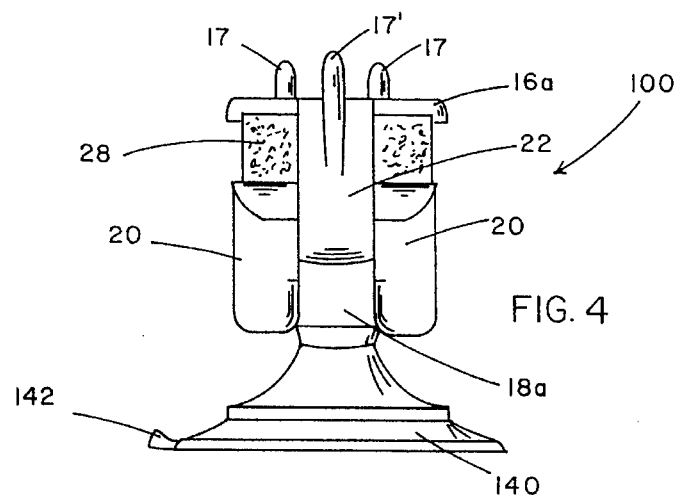
FIG. 4 is an elevational view of the latch end of the fishing rod holder of FIG. 3.
Figure 5:
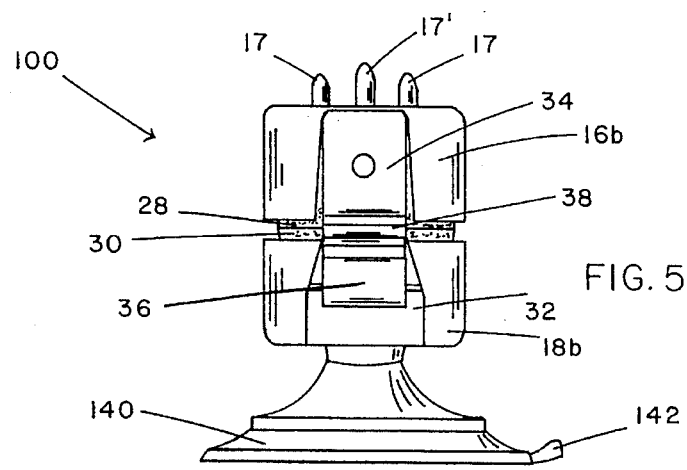
FIG. 5 is an elevational view of the hinge end of the fishing rod holder of FIG. 3.

Rod holder 10 consists of an elongated body 12 mounted on a base 14 which can be affixed to a structural surface S (shown as an example only in FIG. 6), such as a boat deck, garage wall, camper ceiling and the like. An alternative base 140 is seen in FIGS. 3–5 and will be discussed further hereafter. However, unless otherwise specified, other parts of the two embodiments shown will be assumed to be identical.

Both body 12 and base 14 are usually formed mostly of hard plastic and are provided with smoothly rounded edges and corners for a stylish appearance, as well as to avoid snagging lines and clothing and to eliminate any chance of the user being accidentally injured by inadvertently bumping against the device when is secured to a surface. Body 12 has two elongated portions 16,18 of substantially equal length and substantially rectangular transverse cross-section, and each has two opposed ends 16a, 16b, and 18a, 18b, respectively, between which the corresponding body portion 16,18 continuously extends. Elongated portions 16, 18 each have a thickness which is greater at ends 16b, 18b than centrally and will be discussed further hereafter. Elongated portions 16,18 also each have opposed substantially flat outer and inner sides 16c, 16d, 18c, 18d, respectively (sides 16d and 18d facing each other, inwardly, and sides 16c and 18c facing outwardly).

If desired, for improved strength, as well as enhanced appearance, outer side 16c can be provided with longitudinal ridges such as those indicated at 17,17'. It may especially be desired that one such centrally located ridge, 17' extend beyond one end of ridges 17 so as to effectively wrap around and further strengthen end 16a which is expected to be undergo an amount of stress imparted by the repeated opening and closing of device 10.

FIGS. 1, 3 and 6 illustrate that inwardly facing sides 16d, 18d each have cutout portions 16d', 18d' which extend parallel and coextensively to each other when device 10 is closed. These cutout portions serve to receive thick strips 28,30 of soft, impressionable material, such as foam rubber, for example. Strip 28 is preferably permanently mounted within the cutout of body portion 16 and strip 30 is similarly mounted (for example, as by gluing) within the cutout of body portion 18 in such manner that when device 10 is closed the strips are flush with one another and any object placed between them, such as rod R, is grippingly received and retained by the friction of the facing strips 28,30 which naturally and automatically mold themselves around the object.

As explained, in normal use body portions 16,18 are positioned parallel to one the other, touching and overlapping in a clamping manner when in the closed operable position shown in FIGS. 3 and 6 for securing a rod, such as that indicated at R within body portion 12. However, when opened to release the object held therein, or to place an object into device 10, the two body portions 16, 18 are necessarily disposed at an angle relative to one another, as illustrated, for example, in FIG. 1.

The respective positions of body portions 16,18 relative to support surface S will not change. Body portion 16 will always be farther away from surface S, with body portion 18 between surface S and body portion 16. However, whether portion 16 is above or below portion 18 will depend upon whether holder 10 is affixed to an upwardly or a downwardly facing surface S. For example, if holder 10 is affixed to a boat deck, body portion 16 will be uppermost. On the other hand, if holder 10 is connected to a camper ceiling, body portion 16 will be beneath body portion 18.

Of course, if holder 10 is connected to a wall, whether placed with the longitudinal axis of the holder vertically, horizontally, or somewhere in between, portion 16 will always be facing more outwardly relative to the wall than will portion 18. Body ends 16a, 18a are moveably connected to each other, preferably in a hinged manner, as shown in FIGS. 1, 3, 4 and 6, although other pivotal connections can certainly be conceived which will perform adequately.

As illustrated, end 18a of body portion 18 has paired parallel shoulders 20 which are spaced apart and extend to receive between them a depending arm 22 of end 16a of body portion 16. Correspondingly sized through-holes, such as that shown at 24 in FIG. 1 are formed in the shoulders 20 and the arm 22 received therebetween, transversely in relation to the longitudinal axes of corresponding body portions 16, 18. Through-holes 20 are disposed in alignment with one another so as to be capable of journaling therein a shaft or elongated sleeve bearing 26 upon which end 16a rotates so that body portion 16 can be pivotally moved toward or away from body portion 18 in clamping fashion.

Body ends 16b, 18b are selectively releasably connected in an overlapping, latching manner, for example, as shown in FIGS. 1, 2, 3 and 5, although other known closing and locking mechanisms can suffice. As illustrated, a stepped indentation 32 is formed in end 18d, substantially perpendicularly to the longitudinal axis of body portion 18 and perpendicular to the axis of sleeve bearing 26 journaled in aligned through-holes 24. Stepped indentation or notch 32 slidingly receives and retains a depending flange 34 formed on body portion end 16b. Flange 34 has formed at its extreme end, farthest from its connection to end 16b, an inwardly facing lip 36 which engages the step of notch 32 when selectively forced thereover by slight pressure applied to surface 16c of a previously open device 10.

When the user desires to open device 10 and release an object retained therein all that is required is a slight outward pressure against an integral extension 38 of flange 34. To enhance manipulability of flange 34, small transverse ridges 40 are preferably formed on the inner side surface of extension 38. This feature is especially desirable when device 10 is used during fishing, when the user's hands may very likely be slippery with water, bait or fish residue.

FIGS. 1, 2 and 6 illustrate one embodiment of a base, generally designated 14, for releasably connecting body 12 of device 10 to a boat deck or other surface S. Base 14 is preferably formed as an elongated, substantially flat, rigid piece having a generally rectangular cross-section, extending continuously between its two ends 14a, 14b and having an inner side 14c and an opposed outer side 14d. Inner side 14c is to be understood to be that which faces body 10 and outer side 14d thus faces the mounting surface S when device 10 is connected thereto for normal use.

Although not required for adequate performance, for enhanced stability of device 10 in use, the outer side wall 14e of base 14 is preferred to be flared slightly outwardly from its connection to body 12 toward the support surface S. Like body 12, all edges and corners of base 14 are preferably, although not necessarily, smooth or rounded and it is ordinarily made of hard plastic, although other materials, such as wood or metal will suffice.

FIG. 2 shows apertures 42 formed through the depth of base 14 for attachment thereof to a surface, such as S, by known connectors such as screws, brads, nails and the like. Also shown in the figure are grooves 44,46 which are preferably, although not necessarily, formed along the central longitudinal axis and entirely through base 14, from side 14c to side 14d, for receiving and retaining rigid securement buttons 48,50 which are fixed, spaced apart on outer side 18c of body portion 18 substantially adjacent to opposite ends 18b, 18a, respectively. As will be apparent upon understanding the connection of body 12 and base 14, it is conceivable that grooves 44, 46 could be off-center and not entirely through base 14, if corresponding adaptations are provided on body 12.

Groove 44 is shown at end 14b of base 14 to be open-ended, lipped, and provided with an inside, arcuate end directed toward the middle of base 14. So situated and formed, groove 44 slidingly receives button 48 which is slightly offset from the surface of side 18c so as to be capable of being received by lip 44a. Groove 44 and button 48 are so sized and positioned as to be snug and secure in fit, thereby preventing inadvertent detachment of body 12 from base 14, and thus ultimately from surface S.

Button 50 is connected to body portion side 18c near end 18a and is formed in the same, surface off-set manner described above with regard to button 48. It is to be understood that although illustrated with button 48 paired with groove 44 and button 50 received in groove 46, these button and groove pairs can be reversed if it is desired to have body 12 open in the opposite direction, such as, for example, for equally convenient use by both right-handed and left-handed users.

Elongated groove 46 has a lip 46a formed entirely around the inside wall thereof and is preferably arcuately closed at both its ends 46b, 46c, end 46c being slightly enlarged relative to end 46b and the overall transverse dimension of groove 46 in order to be capable of receiving the diameter of button 50. As illustrated, button 50 must first enter groove 46 via end 46c prior to being slidably advanced toward end 46b where it is seated when body 12 is properly mounted on base 14. When connected as described and shown, it is clear that in order to selectively remove body 12 from base 14, the user need only lightly but forcibly longitudinally urge body 12 slidably in relation to the base until buttons 48,50 can be removed from grooves 44,46 via the respectively open or enlarged ends thereof.

FIGS. 3, 4 and 5 illustrate an alternative embodiment of the new rod holder device 100, wherein the only difference from the embodiment just described is in the base 140 and its attachment to body 12. In this case rather than using a separate piece for the base with the button and groove arrangement described, the base is composed entirely of suction cups 140 such as those shown in the figures, directly connected to the body.

Suction cups 140 are secured in known manner, such as by gluing or by known connectors, to body 12 so as to extend transversely, outwardly from side 18c of body portion 18. Thus, body 12 in device 100 can be releasably attached by integral cups 140 directly to surface S. Suction cups 140 may be of the type shown, with small tabs 142 to assist in detachment of the cup from surface S, or of other readily available varieties.

In use, new device 10 can provide a system for holding and storage of fishing rods, even when the rods are fully assembled with reel and line attached. Ordinarily two such devices 10 will be used in tandem, positioned parallel to one another and spaced apart on the surface to which they are attached. The paired holders may be disposed with their longitudinal axes positioned either vertically or horizontally, as desired and convenient for the particular use selected. Which device is chosen, 10 or 100, or some other readily conceivable variation thereon, may depend upon the type of surface to which the holder is to be attached, and whether it will be moved from its position on the supporting surface. Thus, rod holding device 10 with base 14 may be preferred for relatively permanent positioning, whereas device 100 with suction cup base 140 may be more desirable if rapid removal of the entire device from one location to another is expected.

The following are offered as examples of convenient use of the new holders 10,100:

Example 1). A pair of devices 10 may be positioned on a garage or basement wall and spaced apart, ordinarily by a distance of at least about 12 inches. In this case the two devices (or more if desired) can be disposed one above the other, with the longitudinal axes of the holders substantially horizontal, or spacedly side-by-side, with the longitudinal axes positioned substantially vertically so that the rods held therein will be displayed more or less horizontally. In either case, the bases are attached to the wall and the body portions extend substantially horizontally therefrom so that body portions 16 swing out into the room or garage when the corresponding device is opened to permit insertion or removal of a rod.

If desired, with the holders so arranged, the user can store more than one fishing rod in the same set of clamping devices. If necessary, for more efficient fit and economy of use, adjacent rods with or without attached reels and lines can be inverted, so that one points upwardly and the next points downwardly. So arranged, a pair of devices 10, which in this case are approximately seven inches long, can be used to store at least three fishing rods.

Example 2). A single device 10 or 100 can be used by attaching it horizontally to a boat wall to support at least one fishing rod in an upright position with the heavier, reel-bearing ends of the rod directed downwardly and supported from beneath by an interior boat ledge, for example, to keep the rod and reel up off the floor of the boat. For added support a second of the new holder devices can be attached to the wall spacedly and parallel to the first for vertical rod storage just as described in Example 1, but on a boat, rather than in a building.

Example 3). Device 100 may be considered to be particularly handy for convenient transport of fishing rods on a car top. In this case, the suction cup bases 140 of at least two rod holders 100 are attached to the exterior automobile roof transversely relative to the length of the automobile and substantially parallel and spacedly in relation to each other. Thus, a fishing rod clampingly secured by both the holders 100 will be supported approximately parallel to the longitudinal axis of the automobile. Thus, eliminating the need to break down a long fishing rod with reel and line attached. This is especially advantageous for short trips, such as when the user is merely moving from one fishing site to another.

Example 4). Some users will find it particularly advantageous to leave attached paired bases 14 of holders 10 at one pre-attached site, such as a conventional garage wall and simply move the clamping body portions 12 to another, separate set of bases 14 which have been connected, relatively permanently, as by screws, elsewhere, such as inside of a rod locker on a boat or on a boat casting deck or overhead on a camper, van or trailer ceiling.

Thus, with the above in mind, the new holder 10 readily lends itself to preparation and sale as a kit. For example, a kit can be provided for sale which includes two body portions 12 and four bases 14 so that the bases can be permanently secured as described to a support surface and movement of the rod(s) stored in the devices 10 can be effected by simply slidingly removing the body portions 12 with the rods therein from the corresponding bases 14 upon which they are mounted and facilely transferring the rods with bodies 12 attached to the second pair of bases 14.

Alternatively two or four bodies 12 could be provided as a kit with either four or six bases. The above examples, are intended as only that, examples, and certainly are not considered to be exhaustive of the myriad of ways in which the new fishing rod holder as described and shown, and other conceivable variations thereof may be constructed and used.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A device for supporting a rod-shaped object, such as a fishing rod, in a preselected position in relation to a structural surface, the device comprising a base adapted for attachment to the structural surface and a body slideably and releasably connected to the base, the body being formed to receive and retain a portion of the rod-shaped object to thereby permit selective securement and release thereof in a preselected position on the structural surface, wherein the base is an elongated substantially flat rigid piece having a first wide side surface and an opposed second wide side surface and an outer side wall extending between and connecting the first wide surface and the second wide surface, and further wherein the body has a first part and a second part, the first part being elongated and having a first end and a second end and extending therebetween, and the second part being elongated and having a first end and a second end and extending therebetween, and further wherein the first end of the first part and the first end of the second part are selectively, releasably connectable and the second end of the first part and the second end of the second part are movably attached to one another.

2. The device of claim 1, wherein the body first part and the body second part are of substantially equal length, the first end of the body first part and the first end of the body second part being releasably connectable by means of overlapping, latching interconnecting structure, and the second end of the body first part and the second end of the body second part having a pivotal hinge connection.

3. The device of claim 1, wherein the base has paired longitudinal grooves formed from the first wide surface through the second wide surface, the grooves being positioned spacedly from one another and longitudinally outwardly from the center of the base; and wherein the first part of the body has first and second opposed surfaces which extend between and intersect the first end and the second end of the first part of the body and the second part of the body has first and second opposed surfaces which extend between and intersect the first end and the second end of the second part of the body, the second surface of the first part of the body and the first surface of the second part of the body being disposed substantially parallel, adjacent and coextensively when the device is in a normal closed, operating position.

4. The device of claim 3, and further wherein the body has projections on the second surface of the second part of the body, the projections being sized and spaced so as to be capable of sliding interconnection with the longitudinal grooves formed through the base, to thereby selectively releasably interconnect the body to the base.

5. The device of claim 4, and further wherein the longitudinal grooves formed in the base are provided with recessed flanges around perimeters thereof so that the projections formed on the second surface of the second part of the body can interengage the grooves without interfering with the structural surface when the base is mounted thereon.

6. The device of claim 1, and further wherein the base has at least two spaced apart through-holes passing from the first surface to the second surface, to thereby connect the base to the structural surface by at least two connectors received therein, so that the base can remain mounted to the structural surface although the body has been slidably released and removed from the base.

7. The device of claim 1, and further wherein the body of the device includes a substance for gripping the rod-shaped object to thereby securely retain the rod-shaped object within the body when the device is mounted on the structural surface and is in a normally closed, operative position with the body first part and the body second part being substantially parallel and adjacent to each other.

8. The device of claim 7, wherein the substance for grippingly retaining the rod-shaped object is comprised of a layer of soft, impressionable material formed on the second surface of the first part of the body and on the first surface of the second part of the body so that when the second surface of the first part of the body and the first surface of the second part of the body are facing, substantially parallel and coextensive with each other the soft, impressionable material sandwiches and moldably forms around the rod-shaped object retained therein.

9. The device of claim 1, wherein the device includes at least one longitudinal ridge formed on the first surface of the first part of the body to enhance the strength of the first part of the body of the device, to thereby increase the useful life thereof under the stresses formed by repeated opening and closing of the device.

10. A fishing tackle accessory kit comprising at least two fishing rod holders for supporting at least one fishing rod in a preselected position in relation to a structural surface, the holders each having a base adapted for attachment to the structural surface and a body slideably releasably connected to the base, the body being formed to receive and retain a portion of the at least one fishing rod to thereby permit selective releasable mounting thereof in a preselected position relative to the structural surface, wherein the base is an elongated substantially flat rigid piece having a first wide side surface and an opposed second wide side surface and an outer side wall extending between and connecting the first wide surface and the second wide surface, and further wherein the body has a first part and a second part, the first part being elongated and having a first end and a second end and extending therebetween, and the second part being elongated and having a first end and a second end and extending therebetween, and further wherein the first end of the first part and the first end of the second part are selectively, releasably connectable and the second end of the first part and the second end of the second part are movably attached to one another.

11. The fishing tackle accessory kit of claim 10, wherein the base has paired longitudinal grooves formed from the first wide surface through the second wide surface, the grooves being positioned spacedly from one another and longitudinally outwardly from the center of the base; and wherein the first part of the body has first and second opposed surfaces which extend between and intersect the first end and the second end of the first part of the body and the second part of the body has first and second opposed surfaces which extend between and intersect the first end and the second end of the second part of the body, the second surface of the first part of the body and the first surface of the second part of the body being disposed substantially parallel, adjacent and coextensively when the device is in a normal closed, operating position.

12. The fishing tackle accessory kit of claim 11, wherein the body has projections on the second surface of the second part of the body, the projections being sized and spaced so as to be capable of sliding interconnection with the longitudinal grooves formed through the base, to thereby selectively releasably interconnect the body to the base.

13. A method of mounting at least one rod-shaped object to a surface, the method comprising attaching the base of a clamping device to a structural surface in a preselected position, the clamping device having a base adapted for such attachment to a surface and a clamping body slideably releasably connected to the base, wherein the base is an elongated substantially flat rigid piece having a first wide side surface and an opposed second wide side surface and an outer side wall extending between and connecting the first wide surface and the second wide surface, and further wherein the clamping body has a first part and a second part, the first part being elongated and having a first end and a second end and extending therebetween and the second part being elongated and having a first end and a second end and extending therebetween, and still further wherein the first end of the first part and the first end of the second part are selectively, releasably connectable and the second end of the first part and the second end of the second part are pivotally attached to one another, opening the clamping body of the device, by separating the first end of the first part from the first end of the second part so that the first part of the clamping body and the second end of the clamping body are spaced apart from one another at an angle, and placing the at least one rod-shaped object within the angle between the first part of the body and the second part of the clamping body, substantially transversely to the axis of the clamping body, and closing the clamping body on the at least one rod-shaped object.

14. The method of claim 13, and further comprising attaching two or more of the clamping devices to the support surface substantially parallel to and spacedly from one another so that when the at least one rod-shaped object is secured therein each of the two or more clamping devices are positioned substantially transversely relative to a longitudinal axis of the at least one rod-shaped object.

15. A device for supporting a rod-shaped object, such as a fishing rod, in a preselected position in relation to a structural surface, the device comprising a base adapted for attachment to the structural surface and a body slideably and releasably connected to the base, the body being formed to receive and retain a portion of the rod-shaped object to thereby permit selective securement and release thereof in a preselected position on the structural surface, wherein the base is an elongated substantially flat rigid piece having a first wide side surface and an opposed second wide side surface and an outer side wall extending between and connecting the first wide surface and the second wide surface, and further wherein the base has paired longitudinal grooves formed from the first wide surface through the second wide surface, the grooves being positioned spacedly from one another and longitudinally outwardly from the center of the base, and still further wherein the body has a first part and a second part, and the first part of the body has first and second opposed surfaces which extend between and intersect a first end and a second end of the first part of the body and the second part of the body has first and second opposed surfaces which extend between and intersect a first end and a second end of the second part of the body, the second surface of the first part of the body and the first surface of the second part of the body being disposed substantially parallel, adjacent and coextensively when the device is in a closed, operating position.

16. The device of claim 15, and further wherein the base has at least two spaced apart through-holes passing from the first surface to the second surface, to thereby connect the base to the structural surface by at least two connectors received therein, so that the base can remain mounted to the structural surface although the body has been removed from the base.

17. The device of claim 15, and further wherein the longitudinal grooves formed in the base are provided with recessed flanges around perimeters thereof, and projections are formed on the second surface of the second part of the body which can interengage the grooves without interfering with the mounting surface when the base is mounted thereon.

18. The device of claim 15, and further wherein the body of the device includes a substance for gripping the rod-shaped object, to thereby securely retain the rod-shaped object within the body when the device is mounted on the structural surface and is in its normally closed, operative position with the body first part and the body second part being substantially parallel and adjacent to each other.

19. A fishing tackle accessory kit comprising at least two fishing rod holders for supporting at least one fishing rod in a preselected position in relation to a structural surface, the holders each having a base adapted for attachment to the structural surface and a body slideably releasably connected to the base, the body being formed to receive and retain a portion of the at least one fishing rod to thereby permit selective releasable mounting thereof in a preselected position relative to the structural surface, wherein the base is an elongated substantially flat rigid piece having a first wide side surface and an opposed second wide side surface and an outer side wall extending between and connecting the first wide surface and the second wide surface, wherein the base has paired longitudinal grooves formed from the first wide surface through the second wide surface, the grooves being positioned spacedly from one another and longitudinally outwardly from the center of the base;

and wherein the body has a first part and a second part, and the first part of the body has first and second opposed surfaces which extend between and intersect a first end and a second end of the first part of the body and the second part of the body has first and second opposed surfaces which extend between and intersect a first end and a second end of the second part of the body, the second surface of the first part of the body and the first surface of the second part of the body being disposed substantially parallel, adjacent and coextensively when the device is in a closed, operating position.

20. The fishing tackle accessory kit of claim 19, wherein the body has projections on the second surface of the second part of the body, the projections being sized and spaced so as to be capable of sliding interconnection with the longitudinal grooves formed through the base, to thereby selectively releasably interconnect the body to the base.

* * * * *